July 1, 1941.  W. S. ROTHERHAM  2,247,733
SELECTOR
Filed Nov. 22, 1940   2 Sheets-Sheet 1
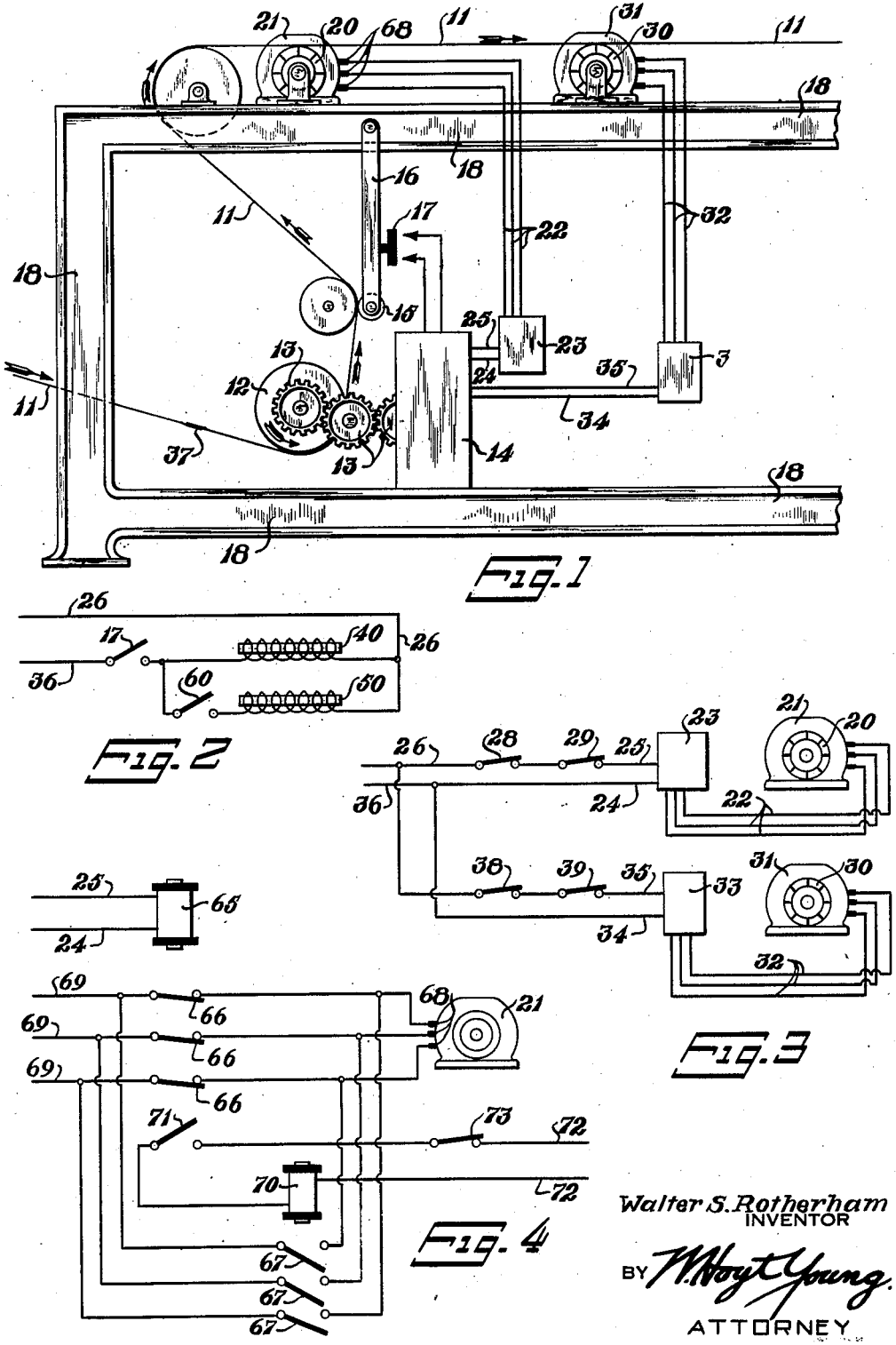
Walter S. Rotherham
INVENTOR
BY W. Hoyt Young.
ATTORNEY July 1, 1941.  W. S. ROTHERHAM  2,247,733
SELECTOR
Filed Nov. 22, 1940  2 Sheets-Sheet 2

Walter S. Rotherham.
INVENTOR
BY
ATTORNEY

Patented July 1, 1941

2,247,733

UNITED STATES PATENT OFFICE 2,247,733

SELECTOR

Walter S. Rotherham, Lincoln Park, N. J., assignor to Hermas Machine Company, Hawthorne, N. J., a corporation Application November 22, 1940, Serial No. 366,752

8 Claims. (Cl. 26—17)

This invention relates generally to means for controlling the operation of a machine employing multiple drives. Its general purpose is to provide a device for automatically stopping and starting the operation of a part of a machine so as to interrupt its function. A further object of the invention is to provide a sensitive detector mechanism actuated by the changing characteristics of the material being processed in the machine, for controlling such a device. A further object of the invention is to provide means for consecutively or selectively stopping and starting a plurality of operations within a predetermined period after the material being processed has caused a detector to function.

It is especially adapted for controlling the operation of the independently driven cutting units on a textile shearing machine. In this application the device is described and illustrated as employed on such a machine wherein the detector and selector are used in combination. In such a machine the fabric passes over, and in contact with a series of cutting units, which must be stopped consecutively as a seam passes through the machine. The purpose of the proposed device is to detect a seam in the cloth prior to its reaching a cutting unit, then momentarily stop said cutting unit as the seam passes it, and then immediately start the cutting unit in operation again. When a series of such cutting units are employed on a single machine the purpose of the selector is to independently control each unit in consecutive order as the seam passes progressively through the entire machine.

A further purpose of the device is to provide means whereby the operation of the detector and selector by one seam, will not allow the second of two seams coming close together on a fabric being processed, to pass through the machine without proper detection of the second seam and functioning of the selector. If such a provision were not made the second seam would clash with the revolving cutting unit causing serious damage to the fabric or even to the machine itself because of its high speed.

Other objects and advantages of the invention will be pointed out in the detailed description to follow when read in conjunction with the drawings, in which—

Fig. 1 is a side elevational view illustrating the invention applied to a textile shearing machine.

Fig. 2 is a wiring diagram of the detector circuit.

Fig. 3 is a wiring diagram of the selector circuit.

Fig. 4 is a wiring diagram of the motor control unit or reversing circuits.

In general this invention provides a device for starting and stopping independently the respective drives on a multiple drive machine, and controlled by the material being processed. It comprises three units in combination, namely a detector, a selector and a motor control unit. In this application the structure is illustrated as employed on a textile shearing machine. The function of the detector is to start the selector operating when a seam in the fabric comes in contact with the detector roll. The function of the selector is fundamentally that of a time switch for controlling the period of operation of the motor control unit. The function of the motor control unit is to stop and start the motor drives within the time period allowed by the selector.

Figure 5:
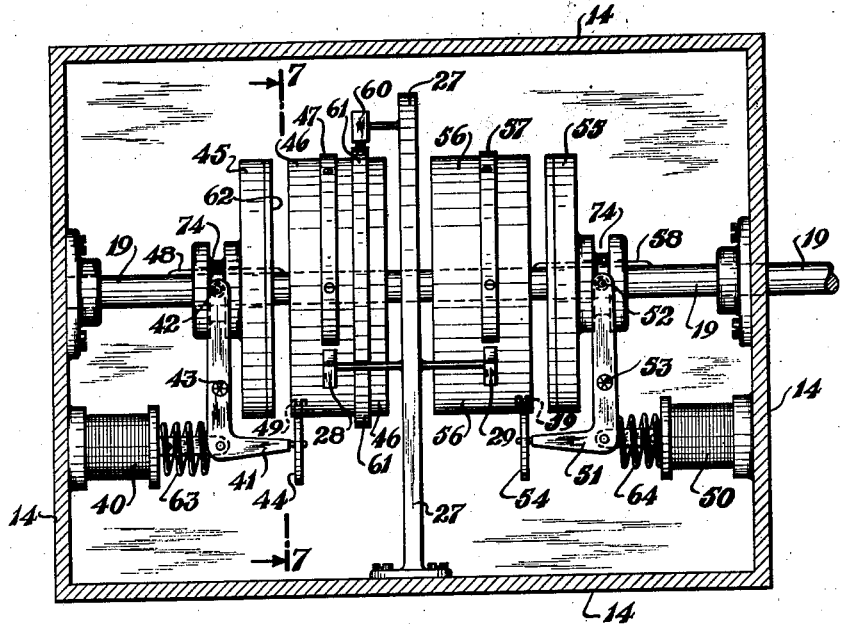
Fig. 5 is a front elevational view partly in section of the selector device.

In detail the device as illustrated in Fig. 1 operates as follows. A fabric 11 to be sheared enters at the left, passes around the selector driving roll 12, and then comes in contact with the detector roll 15. After passing the detector roll the fabric comes in contact with the first cutting unit 20, the second cutting unit 30 and eventually is wound on a take-up roll after passing the plurality of cutting units. The selector driving roll 12 is geared through pinions 13 to the selector driving shaft 19 (Fig. 5). The standard motor drive for said fabric take-up roll and selector driving roll 12 are not shown in the drawings.

The detector roll 15, is radially supported on the arm 16 which is pivoted to the frame 18. Said arm 16 carries the detector switch 17 which is normally open. As the seam 37 in the fabric being processed comes in contact with the detector roll 15 the arm 16 is moved to the right thereby closing switch 17 Fig. 1 and the detector circuit. When switch 17 is closed the detector solenoid 40 (Figs. 2 and 5) is energized which starts the mechanical-electrical selector device 14 Fig. 5 operating.

The function of the selector device is to mechanically open and close the selector switches (28, 29, 38, and 39) which are connected in the primary or operating circuit of the motor control units 23 and 33. Therefore, the closing of the detector solenoid 40 operates the selector and causes the said motor control unit 23 to function whereby the motor 21 and the cutting unit 20 are brought to an immediate stop. Instantly thereafter (the seam 37 having passed cutting unit 20), the motor is started in a forward direction and the cutting unit again put in operation. Before the seam 37 reaches the cutting unit 30, the selector causes the motor control unit 33 to function and stop motor 31. When the said seam 37 has passed cutting unit 30 the motor 31 is again energized for forward rotation.

The motor control unit includes means for reversing the direction of the current in the motor in order to provide a braking effect and cause the motor to decelerate rapidly. The motor must be brought from full speed forward to a static condition within the second's time that a seam would pass from the detector roll 15 to the cutting unit 20 driven by said motor 21. The motor control unit also includes means 73 for opening the reversing circuit as soon as the motor stops so as not to allow the cutting unit to rotate in the reverse direction. If this were not provided the cutting unit would rotate in the reverse direction so long as switch 71 remained closed or until the selector completed its cycle. Means for opening such a circuit is frequently provided in the form of a centrifugal switch 73 of the mercury type. In this type a drop of mercury is thrown by centrifugal force against the contacts of a switch in the circuit. When the rotation stops the mercury flows away from the contacts thus opening the circuit.

The selector circuits as illustrated in Fig. 3 comprise the primary switches 28 and 38 in series respectively with the secondary switches 29 and 39 connected to a power source through leads 26 and 36. When either primary selector switch 28 or the secondary selector switch 29 is opened the motor control unit 23 is operated to momentarily stop the motor 21 and cutting unit 20 as explained above. In the same way switches 38 and 39 indirectly control the second cutting unit 30. The closing and opening of said switches is controlled by the mechanical-electrical device termed a selector and illustrated in Fig. 5. It comprises a shaft 19 driven by gears 13 (Fig. 1) from selector driving roll 12. The speeds of the cloth and the selector device must be in positive relationship since their functions are controlled by a relative time element. Two clutch discs 45 and 55 are keyed or splined to shaft 19. Said discs are adapted to slide axially on shaft 19, and frictionally engage and drive the cam drums 46 and 56 respectively which are journalled on said shaft 19. The drum 46 carries cam strip 47 which is adapted to operate primary selector switches 28 and 38 as the said drum is rotated by frictional engagement with clutch disc 45. Similarly, cam strip 57 on drum 56 is adapted to operate secondary selector switches 29 and 39. Said selector switches are supported by the frame 27.

The cam strips 47 and 57 may be made of any desired length according to the period of time selector switches 28, 29, 38 and 39 are to be held open. Either the position of the selector switches on the frame 27 or the position of the cam strips on the periphery of the cam drums may be adjusted for controlling the time of opening and closing of said switches.

Figures 6, 7, 8:
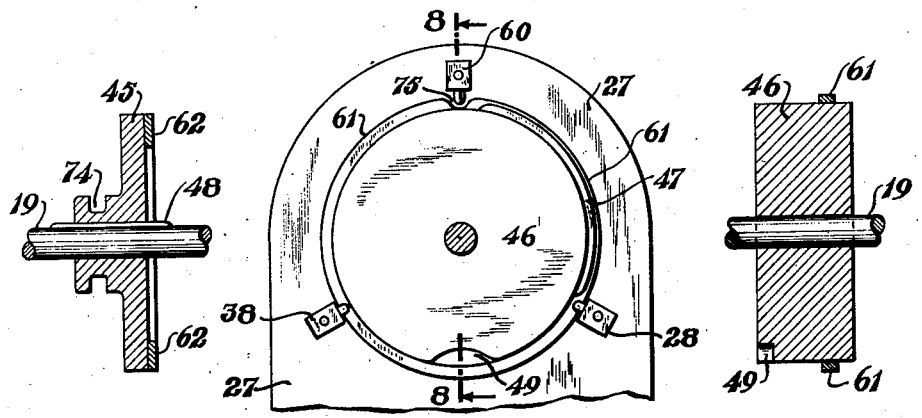
Fig. 6 is a front elevational view of the clutch disc in section on the vertical axis.
Fig. 7 is a side elevational view of the cam drum showing the cam strips and the relative positions of the selector switches.
Fig. 8 is a section on line 8—8 Fig. 7 of the cam drum.

The detailed mechanical-electrical operation of the selector unit 14 is as follows: When the solenoid 40 (Fig. 5) is energized the bell crank 41 is rotated clockwise about its pivot 43. During this operation, the bell crank which is formed at one end into a yoke and provided with pins 42 adapted to ride in annular groove 74 moves the disc 45 to the right along the key 48 or spline thus engaging the friction face 62 of the said disc with the side of the drum 46. At the same time the roller 44 is moved downward out of the curved slot 49 in said drum 46. As a result the drum 46 rotates in unison with the disc 45 which carries the cam strip 47 into contact first with primary selector switch 28 and then with primary selector switch 38, as illustrated in Fig. 7.

After the detector switch 17 has been closed by a seam 37 and the selector 14 placed in operation the cycle of said selector is complete when the drum 46 has made a complete revolution. The rotation of said drum 46 is confined to one complete revolution because of the control of the clutch lock roller 44 operating in conjunction with slot 49 on the periphery of the said drum 46. As the solenoid 40 is momentarily energized and the bell crank 41 swung in a clockwise direction about its pivot 43, the clutch lock roller 44 is swung downward and out of the slot 49 in drum 46. This same operation of the bell crank moves the disc 45 into frictional driving contact with drum 46, whereby the disc and drum rotate in unison. When the solenoid is deenergized the bell crank 41 is urged in a counter-clockwise direction under the influence of spring 63. Since the drum 46 is already rotating, said roller 44 is riding on the surface of the drum 46 which prevents the bell crank 41 from returning to its normal position. During the time the roller 44 rolls along the periphery of the drum 46 it maintains the clutch disc 45 locked in driving contact with said drum. When the drum 46 has completed its revolution the roller 44 drops back into slot 49 under influence of the spring 63, the bell crank 41 shifts the clutch disc 45 to the left (Fig. 5) thereby breaking the driving contact and stopping the rotation of the drum 46. As pointed out above the drum 46 continues to rotate until the roller 44 drops into slot 49 at the end of one complete revolution. However if it is desirable for the drum to complete its cycle and stop rotating at the end of half a rotation or 180 degrees, then two slots 49 must be placed on the periphery of the drum, 180 degrees apart.

Thus in the above described operation I have explained how the selector operates when a single seam passes through the shearing machine. If two seams occur close together in the fabric so that the second seam might pass the detector before the completion of the selector cycle, the operation of the solenoid 40 would have no effect thereon. To prevent trouble arising from a second seam entering the machine in such a manner, a secondary or auxiliary selector circuit is provided. As drum 46 is rotated during the preliminary operation as explained above, the auxiliary solenoid switch 60 (Figs. 2, 5 and 7) located in the auxiliary detector circuit is closed by means of the cam ring 61 and is maintained in said closed position throughout the cycle of operation of the primary selector unit. By referring to Fig. 7 it will be seen that cam ring 61 encompasses the drum 46 except for the slight opening or break 75 at the top. The position of the said switch 60 in the auxiliary detector circuit is shown in Fig. 2. When said auxiliary solenoid switch 60 is closed, a second seam which closed the main detector switch 17 would energize the solenoid 50 and thus start the secondary selector unit into operation.

The energizing of solenoid 50 would move bell crank 51 on its pivot 53 and force clutch disc 55 axially along its key or spline 58 into driving contact with drum 56 and cause the drum to rotate. By contact with the surface of drum 56, the cycle of the secondary selector unit would be completed in one revolution similar to the primary selector unit described above. However if it were predetermined to set the period of operation or cycle so as to provide for rotation of the drum through one third of a circle, then three slots 59 would be required in drum 56 and spaced 120 degrees apart. As the drum 56 rotates it would first open selector switch 29 and then selector switch 39 similar to the operation of the primary selector circuit. At the end of its cycle spring 64 would return bell crank 51 to its normal position.

The motor operating unit or reversing circuit illustrated in Fig. 4 comprises an operating circuit (termed a selector circuit above) provided with a relay 65 and leads 24 and 25 (Figs. 3 and 4) connected in series to the selector switches 28 and 29. The relay 65 is normally energized and retains the three switches 66 connected to the power leads 69 and the motor terminals 68 in a closed position for driving the polyphase motor 21 in a forward or clockwise direction. When either of the selector switches 28 or 29 is opened the relay 65 is deenergized and the said switches 66 drop thereby opening said forward motor circuit. During the same operation in which switches 66 are opened the reversing relay circuit switch 71 is closed which in turn energizes the relay 70 which is connected to the power leads 72. The energizing of relay 70 closes the motor reversing switches 67 which automatically brakes the motor. When the motor stops the centrifugal switch 73, which is rotatively linked to the motor 21, automatically opens thereby deenergizing relay 70, which in turn opens reversing switches 67 for preventing the cutting unit driving motor 21 from actually rotating in a reverse direction. As the selector 14 completes its cycle the relay 65 Fig. 5 is reenergized which closes switches 66 whereby the cutting unit motor 21 is again started in a forward direction.

Since the primary and secondary switches 28 and 29 are connected in series, the opening of either switch will in turn open the circuit used for driving the motors in a forward direction. For practical purposes, two selector units are sufficient on the assumption that it would be unusual for three seams to be placed so close together in a fabric that the function of the primary selector circuit would not be completed before a third seam passed the detector roll. However the number of said circuits may be increased by merely adding additional selector units without departing from my invention.

If three selector units are provided for guarding against three adjacent seams in a fabric the detector unit would be provided with an additional parallel branch similar to parts 60 and 50 in Fig. 2. The mechanism (50–59) shown on the right of frame 27 Fig. 5 would be repeated and a third switch would be placed in each series circuit with switches 28—29 and 38—39. A switch and cam ring similar to 60 and 61 respectively would have to be provided on the second drum 56. The added switch would have to be connected in series with the first switch 60 so that the third selector unit can only function when the first and second units are engaged in operation.

In the same manner, although I have described my invention as adapted to a shearing machine employing only two cutting units, the number of said units may be increased as desired. If three cutting units are employed three selector switches in place of two (28 and 38, or 29 and 39) would be provided on frame 27 and adapted to be operated by cam strip 47 or 57. The two circuits illustrated in Fig. 3 would be increased to three circuits.

I claim:

1. In a device of the type described the combination of a drive shaft, a drum journalled on said shaft, cam strips fastened to the periphery of said drum and adapted to open and close electrical circuits, a slot in the periphery of said drum, a clutch disc splined to said shaft for driving said drum, a bell crank, means carried by said bell crank for axially moving said clutch disc on said shaft into driving engagement with said drum, and a roller carried by said bell crank and adapted to roll on the surface of the rotating drum for retaining said clutch disc in driving engagement with said drum and enter said slot for stopping said rotation.

2. In a device of the type described the combination of a drive shaft, a drum journalled on said shaft, a slot in the periphery of said drum, a clutch disc splined to said shaft for driving said drum, a bell crank, means carried by said bell crank for axially moving said clutch disc on said shaft into driving engagement with said drum, and a roller carried by said bell crank and adapted to roll on the surface of the rotating drum for retaining said clutch disc in driving engagement with said drum and enter said slot for stopping said rotation.

3. In a device of the type described the combination of a drive shaft, a drum journalled on said shaft, a slot in the periphery of said drum, a clutch disc splined to said shaft for driving said drum, and a linkage adapted to move said clutch disc into driving engagement with said drum, and means carried by said linkage and adapted to maintain the driving engagement during the cycle of operation and enter said slot at the end of said cycle for terminating the driving engagement and stopping the rotation of said drum.

4. In a device of the type described the combination of primary and secondary selector units including a drive shaft, primary and secondary drums journalled on said shaft, primary and second clutch discs splined to said shaft for driving their respective drums, means controlled by said drums for retaining their respective clutch discs in driving engagement with its drum during its cycle of operation, and means controlled by the operation of the primary selector unit for engaging the secondary selector unit only when the primary selector unit is operating.

5. In a device of the type described the combination of primary and secondary selector units including a drive shaft, primary and secondary drums journalled on said shaft, primary and secondary clutch discs splined to said shaft for driving their respective drums, a detector circuit for moving the primary selector unit clutch disc into driving engagement with its drum, an auxiliary detector circuit for moving the secondary selector unit clutch disc into driving engagement with its drum, and means operated by the primary selector unit for limiting the functioning of the auxiliary detector circuit to the period during which the primary selector unit is in operation.

6. A device for controlling the operation of a multiple cutting unit textile shearing machine comprising, a detector unit actuated by a seam in the cloth being processed on said machine, a selector unit including a drive shaft, a drum journalled on said shaft, a slot in the periphery of said drum, a clutch disc splined to said shaft for driving said drum, means actuated by said detector unit for moving said clutch disc into driving engagement with said drum, and a linkage adapted to move said clutch disc into driving engagement with said drum, and means carried by said linkage, for maintaining the driving engagement during the cycle of operation, and adapted to enter said slot at the end of said cycle for terminating the driving engagement and stopping the rotation of said drum.

7. A device for controlling the operation of a multiple cutting unit textile shearing machine comprising, a detector unit actuated by a seam in the cloth being processed on said machine, a selector unit including a drive shaft, a drum journalled on said shaft, a clutch disc splined to said shaft for driving said drum, means actuated by said detector unit for moving said clutch disc into driving engagement with said drum, means controlled by said drum for retaining the clutch disc in driving engagement with said drum during the cycle of operation, a motor operating unit including, circuits controlled by said selector unit for driving the cutting unit motors forward and reversing the current for braking said motors, and means controlled by the rotation of said motors for opening the reverse current circuits when the motor stops.

8. A device of the type described including a drive shaft, a driving element mounted on said shaft and adapted to rotate therewith, a driven element normally retained in a non-rotative condition, a slot in said driven element, a linkage for engaging the elements in driving relation, and means coupled with said linkage and operated by said driven element for maintaining said elements in driving relation throughout the cycle of operation, said means being adapted to enter the slot in the driven element whereby said elements are disengaged and the driven member brought to rest at the end of said cycle.

WALTER S. ROTHERHAM.